United States Patent [19]

Clark et al.

[11] Patent Number: 4,731,795
[45] Date of Patent: Mar. 15, 1988

[54] SOLID STATE LASER

[75] Inventors: John H. Clark, Wheaton; Dennis L. Werth, Indian Head Park both of Ill.

[73] Assignee: Amoco Corporation, Chicago, Ill.

[21] Appl. No.: 879,157

[22] Filed: Jun. 26, 1986

[51] Int. Cl.⁴ ............................................. H01S 3/08
[52] U.S. Cl. .................... 372/107; 372/101; 372/71; 372/66; 372/21; 372/22; 372/108; 372/109
[58] Field of Search ............ 372/62, 108, 107, 61, 372/65, 98, 71, 66, 21, 22

[56] References Cited

U.S. PATENT DOCUMENTS

| 4,044,315 | 8/1977 | Snitzer | 372/68 |
| 4,383,318 | 5/1983 | Barry et al. | 372/70 |
| 4,525,842 | 6/1985 | Myers | 372/65 |
| 4,546,476 | 10/1985 | Shaw et al. | 372/6 |
| 4,553,238 | 11/1985 | Shaw et al. | 372/6 |
| 4,653,056 | 3/1987 | Baer et al. | 372/21 |

OTHER PUBLICATIONS

Washio et al; "Room-Temperature CW Operation of an Efficient Miniaturized Nd:YAG Laser End-Pumped by a Superlum. Diode"; Appl. Phys. Lett 29 (11); 1 Dec.'76.

Chester et al; "Min. Diode-Pumped Nd:YAIG Lasers"; Appl Phys Lett vol. 23, No. 5, Sep. 1, 1973.

Primary Examiner—Léon Scott, Jr.
Attorney, Agent, or Firm—Richard A. Kretchmer; William H. Magidson; Ralph C. Medhurst

[57] ABSTRACT

An optically pumped solid state laser which is constructed of components held in association by a support structure which is configured to receive the components and automatically arrange them with respect to one another along an optical path.

20 Claims, 4 Drawing Figures

SOLID STATE LASER

FIELD OF THE INVENTION

1. Field of the Invention

This invention relates to an optically pumped solid state laser and a method for its manufacture. More particularly, it relates to such a laser which is constructed of components which are held in association by a support structure which is configured to receive the components and automatically arrange them with respect to one another along an optical path upon insertion into the support structure.

2. Description of the Prior Art

During the period of time since the first operating laser was demonstrated in 1960, laser development work has resulted in a wide variety of lasers in terms of size, power, output frequency, active medium (lasant material) and method of excitation. For the most part, these devices can be classified as precision instruments and are typically handmade by skilled craftsmen. Features which such devices share in common include a resonator, a pump source (a source of energy to either create or activate the lasant material), and means for removing heat. Aside from solid state semiconductor laser diodes, such as those based on gallium arsenide and gallium aluminum arsenide, most of the currently available lasers are based on gas-discharge technology and are both large and inefficient. Such gas-discharge technology involves either the direct use of a gas discharge, as in a carbon dioxide laser, or the indirect use of a gas discharge, as in a flash lamp which is used to excite a lasant material.

When the optical components of a laser are relatively far apart (about 15 to 800 cm in conventional lasers), small angular misalignments result in substantial losses in laser output power. Accordingly, laser resonators are designed to ensure the maintenance of a stable orientation of these optical components. This design requirement has dictated the use of highly rigid materials such as Invar, glass, granite, steel and various ceramics for resonator construction.

Heat which is produced as an undesired by-product of laser operation has also placed constraints on the design of laser resonators. Temperature fluctuations produced by such heat result in thermally induced distortions of the resonator and associated misalignment of the optical components within the resonator. Accordingly, conventional laser designs have addressed this problem through the use of materials having a low coefficient of thermal expansion, such as Invar, quartz and various ceramics, and also by using external cooling means to thermally stabilize the resonator.

The use of flashlamps, light-emitting diodes, laser diodes and laser diode arrays to optically pump or excite a solid lasant material is well known. Lasant materials commonly used in such solid state lasers include crystalline or glassy host materials into which an active material, such as trivalent neodymium ions, is incorporated. Conventional host materials for neodymium ion include glass and yttrium aluminum garnet (referred to as YAG). By way of example, when neodymium-doped YAG is employed as the lasant material in an optically pumped solid state laser, it is typically pumped by absorption of light having a wavelength of about 810 nm and emits light having a wavelength of 1,064 nm.

U.S. Pat. No. 3,624,545 issued to Ross on November 30, 1971, describes an optically pumped solid state laser composed of a YAG rod which is side-pumped by at least one semiconductor laser diode. Similarly, U.S. Pat. No. 3,753,145 issued to Chesler on August 14, 1973, discloses the use of one or more light-emitting semiconductor diodes to end pump a neodymium-doped YAG rod. The use of an array of pulsed laser diodes to end pump a solid lasant material such as neodymium-doped YAG is described in U.S. Pat. No. 3,982,201 issued to Rosenkrantz et al. on September 21, 1976. Finally, D. L. Sipes, *Appl. Phys. Lett.*, Vol. 47, No. 2, 1985, pp. 74–75, has reported that the use of a tightly focused semiconductor laser diode array to end pump a neodymium-doped YAG results in a high effeciency conversion of pumping radiation having a wavelength of 810 nm to output radiation having a wavelength of 1,064 nm.

Materials having nonlinear optical properties are well known and have the ability to function as harmonic generators. For example, U.S. Pat. No. 3,949,323 issued to Bierlen et al. on April 6, 1976, discloses the use as second harmonic generators of materials having the formula $MTiO(XO_4)$ where M is at least one of K, Rb, Tl and $NH_4$; and X is at least one of P or As, except when $NH_4$ is present then X is only P. This generic formula includes potassium titanyl phosphate, $KTiOPO_4$, a particularly useful nonlinear material. Other known nonlinear optical materials include, but are not limited to, $KH_2PO_4$, $LiNbO_3$, $KNbO_3$, $LiIO_3$, $HIO_3$, $KB_5O_8 \cdot 4H_2O$ and urea. A review of the nonlinear optical properties of a number of different uniaxial crystals has been published in *Sov. J. Quantum Electron.*, Vol. 7, No. 1, January 1977, pp. 1–13.

Nonlinear optical materials can be utilized to frequency double the output radiation of a solid state laser. For example, it has been reported by R. F. Belt et al., *Laser Focus/Electro-Optics*, October 1985, pp. 120–121, that potassium titanyl phosphate can be utilized to frequency double the 1,064 nm output of a neodymium-doped YAG laser to afford light having a wavelength of 532 nm.

U.S. Pat. No. 4,276,520 issued to Rosenberg on June 30, 1981, is directed to a portable, optically pumped laser which utilizes a crystalline lasant material. However, this laser uses a flash tube rather than a solid state device as an optical pump, and the patent neither teaches nor suggests the use of a support structure which is configured to receive the various laser components and automatically arrange them with respect to one another along an optical path upon insertion into the support structure.

SUMMARY OF THE INVENTION

The present invention is directed to the discovery that an optically pumped solid state laser which is rugged, lightweight and compact can be easily constructed through the use of a support structure which is configured to receive the various laser components and automatically arrange them with respect to one another. For the purposes hereof, a "laser component" means an optical pump and output coupler together with any intermediate active or passive optical elements and any ancillary packaging for these elements, said elements including a gain medium and any focusing and nonlinear optical elements, but excluding any power supply for the optical pump. It will be appreciated, of course, that the output coupler comprises the mirror which defines the end of the laser resonator or cavity.

One embodiment of the invention is an optically pumped laser comprised of solid state components which are held in association by a support structure wherein said support structure is configured to receive the components and automatically arrange them with respect to one another along an optical path upon insertion into the support structure.

An object of this invention is to provide an improved optically pumped solid state laser.

Another object of this invention is to provide an optically pumped solid state laser which is compact in size.

Another object of this invention is to provide an optically pumped solid state laser which is lightweight.

Another object of this invention is to provide an optically pumped solid state laser which is relatively insensitive to shock.

Another object of the invention is to provide a method for the easy assembly of an optically pumped solid state laser.

A further object of the invention is to provide an optically pumped solid state laser which can be constructed, at least in part, from materials such as plastics which have a relatively high coefficient of thermal expansion and a relatively low modulus of elasticity.

A further object of the invention is to provide a method for the mass production of optically pumped solid state lasers.

A still further object of the invention is to provide a method for the use of injection molding techniques in the manufacture of optically pumped solid state lasers.

DETAILED DESCRIPTION OF THE PREFERRED EMBODIMENTS

While this invention is susceptible of embodiment in many forms, there are shown in FIGS. 1-4 two specific embodiments, with the understanding that the present disclosure is not intended to limit the invention to the embodiments illustrated.

Figure 1:
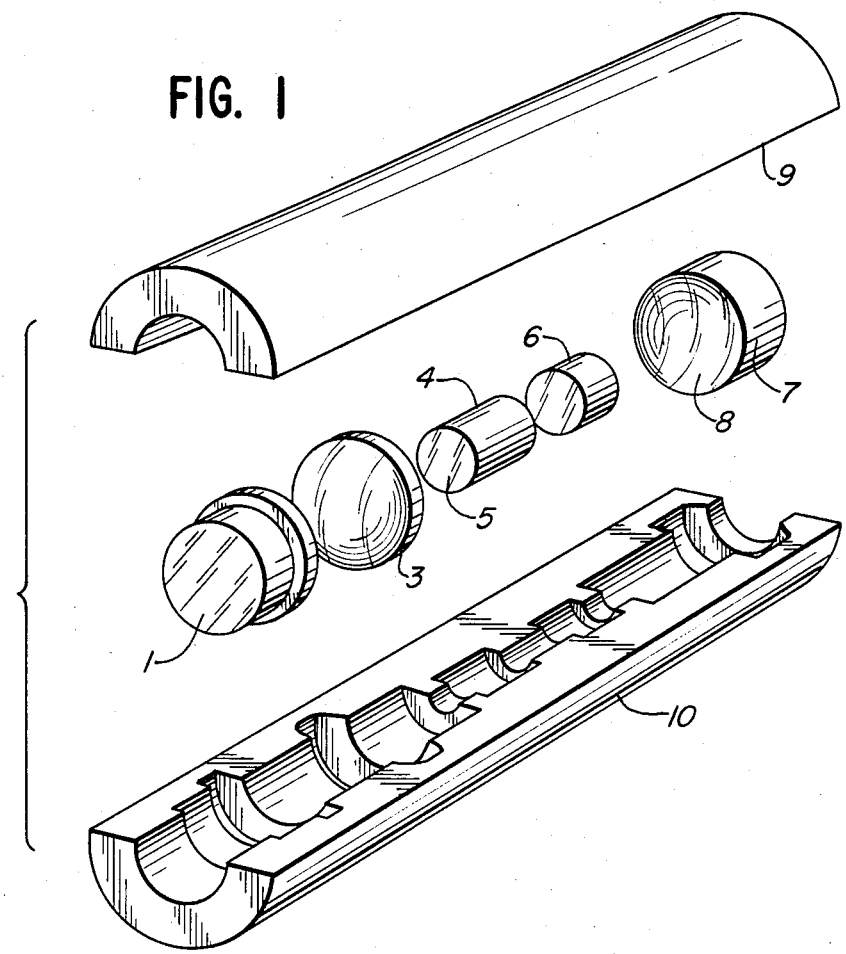
FIG. 1 of the drawings is an exploded view of an embodiment of this invention.
Figure 2:
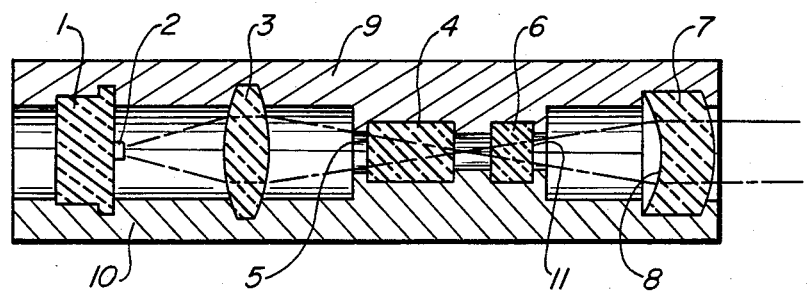
FIG. 2 of the drawings is a cross section of the same embodiment of this invention as set forth in FIG. 1.

FIGS. 1 and 2 of the drawings illustrate a single embodiment of the optically pumped laser of this invention which has a substantially cylindrical configuration. FIG. 1 is an exploded view of this embodiment, whereas FIG. 2 is a cross section.

With reference to FIGS. 1 and 2, light from an optical pumping means, which consists of elements 1 and 2, is focused by lens 3 onto lasant material 4 which has a suitable reflective coating on surface 5 and is capable of being pumped by the light from said pumping means (1 and 2). The reflective coating on surface 5 is highly transparent with respect to light produced by the pumping means (1 and 2) but is highly reflective with respect to light produced by the lasing of lasant material 4. Light emitted by the lasing of lasant material 4 is passed through nonlinear optical material 6 to output coupler 7 which has a suitable reflective coating on surface 8 which is highly reflective with respect to light emitted by lasant material 4 but substantially transparent to frequency-modified light produced by nonlinear optical material 6. Output coupler 7 is configured in such a manner that it serves to collimate the output radiation from the laser which passes through it.

Each of the components of the laser, optical pumping means (1 and 2), lens 3, lasant material 4, nonlinear optical material 6 and output coupler 7, fits into a support structure which is composed of two parts, 9 and 10, which fit together and enclose the components in a substantially tubular housing. The support structure (9 and 10) is configured to receive the components and automatically arrange them with respect to one another along an optical path upon insertion into said support structure.

Suitable optical pumping means include, but are not limited to, laser diodes, light-emitting diodes and laser diode arrays, together with any ancillary packaging or structures. For the purposes hereof, the term "optical pumping means" includes any heat sink or packaging associated with said laser diodes, light-emitting diodes and laser diode arrays but excludes any associated power supply. For example, such devices are commonly attached to a heat resistant and conductive heat sink and are packaged in a metal housing. A highly suitable optical pumping source consists of a gallium aluminum arsenide laser diode 2 emitting light having a wavelength of about 810 nm, which is attached to heat sink 1. Heat sink 1 can be passive in character. However, heat sink 1 can also comprise a thermoelectric cooler to help maintain laser diode 2 at a constant temperature and thereby ensure optimal operation of laser diode 2. It will be appreciated, of course, that during operation the optical pumping means will be attached to a suitable power supply. Electrical leads from laser diode 2 which are directed to a power supply are not illustrated in FIGS. 1 and 2.

Lens 3 serves to focus light from laser diode 2 onto lasant material 4. This focusing results in a high pumping intensity and an associated high photon to photon conversion efficiency in lasant material 4. Any conventional optical means for focusing light can be used in place of simple lens 3. For example, a gradient index lens, a ball lens, an aspheric lens or a combination of lenses can be utilized. It will be appreciated, however, that lens 3 is not essential to the laser of this invention and the use of such focusing means merely represents a preferred embodiment.

Any conventional lasant material 4 can be utilized provided that it is capable of being optically pumped by the optical pumping means selected. Suitable lasant materials include, but are not limited to, materials selected from the group consisting of glassy and crystalline host materials which are doped with an active material. Highly suitable active materials include, but are not limited to, ions of chromium, titanium and the rare earth metals. By way of specific example, neodymium-doped YAG is a highly suitable lasant material 4 for use in combination with an optical pumping means which produces light having a wavelength of 810 nm. When pumped with light of this wavelength, neodymium-doped YAG can emit light having a wavelength of 1,064 nm.

Lasant material 4 is shown as a rod in FIGS. 1 and 2. However, it will be appreciated that the precise geometric shape of this component can vary widely. For example, the lasant material can have lens-shaped surfaces or be rhombohedral in shape if desired. Although not illustrated in the drawings, a preferred embodiment of the invention involves the use of a fiber of lasant material which is end-pumped by the optical pumping means. Highly suitable fibers for this purpose include, but are not limited to, glass optical fibers which are doped with ions of a rare earth metal such as neodymium. The length of such a fiber is easily adjusted to result in absorption of essentially all of the light from the optical pumping means. If a very long fiber is required, it can be coiled, on a spool for example, in order to minimize the overall length of the laser of this invention.

Lasant material 4 has a reflective coating on surface 5. This coating is conventional in character and is selected so that it transmits as much as possible of the incident pumping radiation from laser diode 2 while being highly reflective with respect to the radiation produced by lasing of lasant material 4. In a preferred embodiment, this coating will also be highly reflective of the second harmonic of the radiation produced by lasing of lasant material 4. High reflectivity of this second harmonic will serve to prevent the pump-side loss of any frequency doubled radiation which is produced by nonlinear optical material 6 upon reflection of light, which is not fequency doubled, back through nonlinear optical material 6 by the coating on surface 8.

For a neodymium-doped YAG rod 4 which is pumped with light having a wavelength of 810 nm, the coating on surface 5 should be substantially transparent to said 810 nm light and highly reflective with respect to light having a wavelength of 1,064 nm. In a highly preferred embodiment, this coating will also be highly reflective of light having a wavelength of 532 nm, the second harmonic of the aforementioned 1,064 nm light. It will be appreciated, of course, that the wavelength selective mirror which is created by the coating on surface 5 need not be located on said surface. If desired, this mirror can be located anywhere between the optical pumping means and the lasant material, and can consist of a coating deposited on any suitable substrate. In addition, the mirror can be of any suitable shape.

Light emitted by the lasing of lasant material 4 is passed through nonlinear optical material 6. By proper orientation of the crystal structure of the nonlinear optical material 6 with respect to the incident light produced by lasant material 4, the frequency of the incident light can be modified, for example, doubled or tripled, by passage through nonlinear optical material 6. By way of specific example, light having a wavelength of 1,064 nm from a neodymium-doped YAG lasant material 4 can be converted to light having a wavelength of 532 nm upon passage through nonlinear optical material 6. Although nonlinear optical material 6 is shown as a rod in FIGS. 1 and 2, it will be appreciated that the geometric shape of this component can vary widely. For example, the nonlinear optical material can have lens-shaped surfaces or be rhombohedral in shape if desired. It will also be appreciated that any such nonlinear optical component can comprise heating or cooling means to control the temperature of said nonlinear optical material and thereby optimize its performance as a harmonic generator.

Potassium titanyl phosphate is a highly preferred nonlinear optical material. However, it will be appreciated that any of the many known nonlinear optical materials can be utilized in the practice of this invention. Such known nonlinear optical materials include, but are not limited to, $KH_2PO_4$, $LiNbO_3$, $KNbO_3$, $LiIO_3$, $HIO_3$, $KB_5O_8 \cdot 4H_2O$, urea and compounds of the formula $MTiO(XO_4)$ where M is selected from the group consisting of K, Rb and Tl, and X is selected from the group consisting of P and As. It will also be appreciated that nonlinear optical material 6 is not an essential laser component and its use merely represents one embodiment of this invention.

As a consequence of the fact that nonlinear optical material 6 is not 100 percent efficient as a second harmonic generator, light passed through this component from lasant material 4 will ordinarily consist of a mixture of frequency doubled light and unmodified light. In the case of light having a wavelength of 1,064 nm from neodymium-doped YAG as the lasant material 4, the light passed through nonlinear optical material 6 will be a mixture of 1,064 nm and 532 nm wavelengths. This mixture of wavelengths is directed to output coupler 7 which has a reflective coating on surface 8 which is wavelength selective. This coating is conventional in character and is selected in such a manner that it is substantially transparent to the 532 nm light but highly reflective with respect to the 1,064 nm light. Accordingly, essentially only frequency doubled light having a wavelength of 532 nm is emitted through the output coupler.

The wavelength selective mirror which is created by the coating on surface 8 need not be of the precise design illustrated in FIGS. 1 and 2 and can be of any conventional form. For example, the wavelength selective mirror can be created by a coating on surface 11 of nonlinear optical material 6. In this event, output coupler 7 could be either eliminated or replaced by optical means whose sole purpose is to collimate or otherwise modify the output radiation from the laser. However, the concave shape of the mirror created by the coating on surface 8 has the advantage of focusing reflected light, which has not been frequency doubled, back onto nonlinear optical material 6, through lasant material 4 and onto the coating on surface 5. As set forth above, in a preferred embodiment, this coating on surface 5 is highly reflective of both frequency doubled and unmodified light from the lasing of lasant material 4. Accordingly, frequency-unmodified light reflected by the coating on surface 8 is partially frequency doubled by passage through nonlinear optical material 6, the resulting mixture of wavelengths is reflected from the coating on surface 5 back through nonlinear optical material 6 where some of the residual frequency-unmodified light is frequency doubled, and the frequency doubled light is emitted through output coupler 7. Except for losses which may occur as a result of processes such as scattering or absorption, further repetition of this series of events results in essentially all of the light produced by the lasing of lasant material 4 being frequency doubled and emitted through output coupler 7.

Support structure (9 and 10) is constructed with indentations in it which receive the various laser components and automatically arrange these components along an optical path upon their insertion. Each indentation is structured to receive a specific component but, otherwise, can be of any desired geometric shape. For example, the indentation can be a V-shaped or U-shaped groove of appropriate length. The support structure is preferably configured so that the laser components are arranged with respect to each other within predetermined tolerances upon insertion into support structure (9 and 10). If desired, these tolerances can be relatively large so that the components are arranged at substantially correct distances from each other with optimization of laser performance being achieved by empirical adjustment of the final spacing between the components. Upon optimization of laser performance, the components can be permanently fixed in place using conventional mechanical means, such as set screws, or conventional adhesives or bonding agents. A highly preferred embodiment of the invention involves the use of a support structure which is configured so that the laser components are arranged in operative association with respect to one another along an optical path upon insertion into the support structure (9 and 10).

The support structure is composed of two parts, 9 and 10, which fit together. These two parts can be bonded together using any conventional technique or combination of techniques. For example, parts 9 and 10 can be welded or bonded together with one or more adhesives or bonding agents. Alterntively, parts 9 and 10 can be bonded together by mechanical fastening means, such as snap type connecting means incorporated into the parts themselves.

The support structure (9 and 10) illustrated in FIGS. 1 and 2 forms a substantially tubular structure around the various laser components. It will be appreciated, however, that this is merely one embodiment of the invention, and the support structure of this invention can be of any convenient shape or configuration. For example, the support structure need not surround the laser components on all but two sides as shown in FIGS. 1 and 2. If desired, the support structure can be designed to form a substantially flat platform, a tray or a trough. It will be appreciated that the precise shape and configuration of the support structure will frequently be dictated by considerations of manufacturing convenience and intended use of the laser.

The support structure of this invention can be composed of any suitable rigid material, such as metals, ceramics, glass, thermoplastic materials and thermosetting materials. In addition, the support structure can be fabricated by any conventional technique. For example, a metal support structure can be fabricated by machining or die casting, and die cast aluminum support structures are particularly satisfactory. A highly preferred embodiment of the invention involves the use of a support structure which is comprised of one or more thermoplastic materials. Suitable thermoplastic materials include, but are not limited to, polyvinyl chloride, nylons, fluorocarbons, linear polyethylene, polyurethane prepolymer, polystyrene, polypropylene, and cellulosic and acrylic resins. If desired, composites of such thermoplastic materials with various fibers or other strengthening agents can also be employed. Thermoplastic and glass support structures can be conveniently fabricated by injection molding techniques.

As illustrated in FIGS. 1 and 2, the support structure can be fabricated in two or more segments which are then assembled about the laser components.

The optically pumped solid state laser of this invention can be of essentially any size, but is preferably very small. For example, the overall length of the support structure containing the various laser components is desirably less than about 20 cm, preferably less than about 10 cm and more preferably less than about 5 cm. As a consequence of such relatively small sizes, plastics become highly suitable for use in constructing the support structure for the laser components. At these relatively small sizes, the relatively poor rigidity and thermal expansion properties of plastics are essentially irrelevant.

Figure 3:
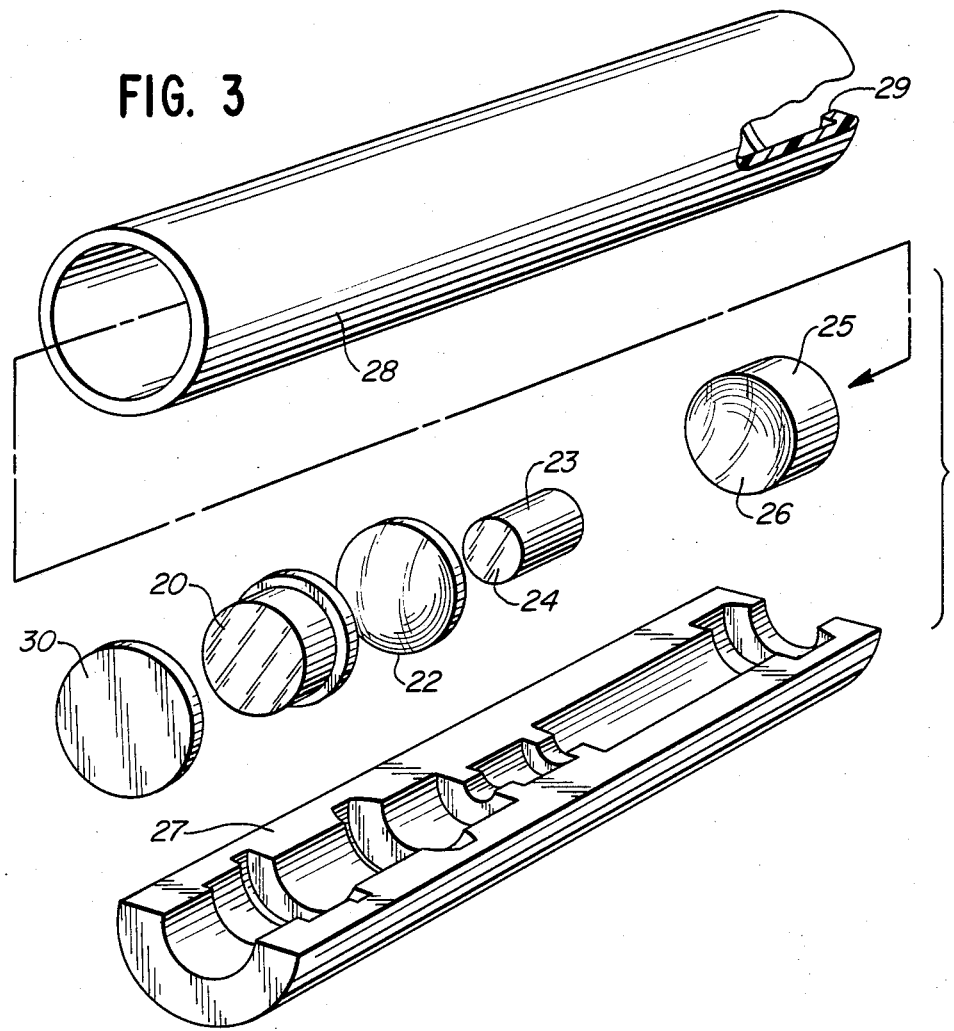
FIG. 3 of the drawings is an exploded view of another embodiment of this invention.
Figure 4:
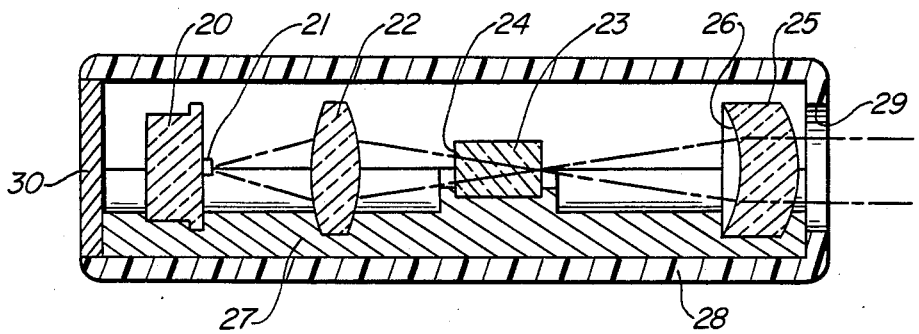
FIG. 4 of the drawings is a cross section of the same embodiment of this invention as set forth in FIG. 3.

FIGS. 3 and 4 illustrate another single embodiment of the invention. FIG. 3 is an exploded view of this embodiment, whereas FIG. 4 is a cross section.

With reference to FIGS. 3 and 4, light from an optical pumping means, which consists of elements 20 and 21, is focused by lens 22 onto lasant material 23 which has a suitable reflective coating on surface 24 and is capable of being pumped by the light from said pumping means (20 and 21). The reflective coating on surface 24 is highly transparent with respect to light from pumping means (20 and 21) but is highly reflective with respect to light produced by the lasing of lasant material 23. Light emitted by the lasing of lasant material 23 is directed to output coupler 25 which has a suitable reflective coating on surface 26 and is configured to collimate the light passing through it.

The reflective coating on surface 26 is selected so that it will transmit some, but not all, of the light emitted by the lasing of lasant material 23. For example, the coating on surface 26 can have a reflectivity of about 95 percent with respect to the light emitted by lasant material 23. Suitable reflective coatings for use on surfaces 24 and 26 are conventional in the art.

Each of the laser components, optical pumping means (20 and 21), lens 22, lasant material 23 and output coupler 25 fits into the support structure 27. The support structure 27 is constructed with a unique identation for each laser component, with the indentations being appropriately spaced. Upon being fitted into these indentations, the various components are automatically arranged with respect to one another along an optical path. If desired, the various laser components can be permanently fixed in place after insertion into the support structure using conventional mechanical means or conventional adhesives or bonding agents.

A substantially tubular housing 28 fits around the support structure 27 and laser components (20 and 21), 22, 23 and 25. Housing 28 is fitted with a flange 29 at one end and is adapted to receive an end plug 30 at the other end. End plug 30 can be attached to housing 28 by welding or through the use of one or more adhesives or bonding agents. Alternatively, end plug 30 can be attached to housing 28 by mechanical means. By way of example, the plug 30 and housing 28 can be provided with screw threads so that they can be screwed together and held together by the screw threads.

The housing 28 and end plug 30 can be composed of any suitable material. Such materials include, but are not limited to, metals, ceramics, thermoplastic materials and thermosetting materials.

By way of specific illustration, the optical pumping means consists of a heat sink 20 and a gallium aluminum arsenide diode laser 21 which emits light having a wavelength of 810 nm. Electrical leads from laser diode 21, which are directed to a power supply, are not illustrated in FIGS. 3 and 4. Light from laser diode 21 is focused by lens 22 onto a rod of neodymium-doped YAG 23 which emits light having a wavelength of 1,064 nm, and light of this wavelength is released from the laser through output coupler 25 in a collimated or otherwise appropriately divergent beam.

In comparison with the embodiment of FIGS. 1 and 2, the embodiment of FIGS. 3 and 4 differs in that: (a) it does not utilize a nonlinear optical material [6 in FIGS. 1 and 2]; (b) the support structure in FIGS. 1 and 2 is fabricated in two segments, 9 and 10, whereas the support structure 27 of FIGS. 3 and 4 is composed of a single segment; and (c) a housing 28 is fitted around the support structure and laser components in FIGS. 3 and 4 but not in FIGS. 1 and 2.

We claim:

1. An optically pumped laser comprising:
   (a) solid-state component means for generating laser light along an optical path, said solid-state component means including solid-state optical pumping means for generating optical pumping radiation at a preselected wavelength, and a lasant member comprising a solid lasant material for receiving said radiation from said optical pumping means and emitting laser light; and
   (b) at least one monolithic support for supporting said solid-state component means, said monolithic support comprising a pumping means-support portion for supporting said optical pumping means and a lasant member support portion for supporting said lasant member, said pumping means-support portion defining a pumping means-receiving indentation in said monolithic support for securely receiving said optical pumping means and said lasant member support portion defining a lasant member-receiving indentation in said monolithic support for securely receiving said lasant member.

2. The optically pumped laser of claim 1 wherein said support structure is comprised of at least one material selected from the group consisting of metals, ceramics, glass, thermoplastic materials and thermosetting materials.

3. The optically pumped laser of claim 1 which comprises two monolithic supports which are adhesively bonded together to define a substantially tubular structure around said solid-state component means.

4. The optically pumped laser of claim 1 wherein said optical pumping means is comprised of at least one laser diode.

5. The optically pumped laser of claim 4 wherein said laser diode is comprised of gallium aluminum arsenide and said lasant member is a neodymium-doped yttrium aluminum garnet.

6. The optically pumped laser of claim 1 wherein said optical pumping means is comprised of at least one light-emitting diode.

7. The optically pumped laser of claim 1 wherein said optical pumping means is comprised of at least one laser diode array.

8. The optically pumped laser of claim 1 wherein said lasant member is comprised of a glass optical fiber which is doped with ions of a rare earth metal.

9. The optically pumped laser of claim 1 wherein said solid-state component means additionally comprises focusing means for focusing light from said optical pumping means onto said lasant material; and said monolithic support has a focusing means-support portion for supporting said focusing means positioned between said pumping means-support portion and said lasant member-support portion, said focusing means-support portion defining a focusing means-receiving indentation in said monolithic support for securely receiving said focusing means.

10. The optically pumped laser of claim 9 wherein light from said optical pumping means is focused onto an end of a rod of said lasant member.

11. The optically pumped laser of claim 9 wherein light from said optical pumping means is focused onto an end of a fiber of said lasant member.

12. The optically pumped laser of claim 9 wherein said optical means for focusing light from said optical pumping means is a gradient index lens.

13. The optically pumped laser of claim 1 wherein said solid-state component means additionally comprises a nonlinear optical member of modifying the frequency of said laser light from said lasant member; and said monolithic support additionally comprises a nonlinear optical member support portion positioned downstream of said lasant member, said nonlinear optical member support portion defining a nonlinear optical member-receiving indentation in said monolithic support for securely receiving said nonlinear optical member.

14. The optically pumped laser of claim 13 wherein said nonlinear optical material is effective to frequency double said output radiation from the lasant member.

15. The optically pumped laser of claim 13 wherein said lasant material is neodymium-doped yttrium aluminum garnet and said nonlinear optical material is potassium titanyl phosphate.

16. The optically pumped laser of claim 1 wherein said solid-state component means additionally comprises an output coupler; and said monolithic support additionally comprises an output coupler support portion positioned downstream of said lasant member, said output coupler support portion defining an output coupler-receiving indentation in said monolithic support for securely receiving said output coupler.

17. An optically pumped laser comprising:
   (a) solid-state component means for generating laser light along an optical path, said solid-state component means including solid-state optical pumping means for generating optical pumping radiation at a preselected wavelength, and a lasant member comprising a lasant material for receiving said radiation from said optical pumping means and emitting laser light;
   (b) a housing comprising an input end, an output end, and an end plug, said end plug being adapted to be received in said input end of said support housing, and said output end having an opening therein for allowing laser light to be transmitted therethrough; and
   (c) a generally trough shaped support structure extending along said optical path for insertion into said housing and for supporting and housing said solid-state component means, said trough shaped support structure comprising a pumping means-support portion for supporting said optical pumping means and a lasant member support portion for supporting said lasant member, said pumping means-support portion defining a pumping means-receiving indentation in said support structure for securely housing and receiving said optical pumping means and said lasant member support portion defining a lasant member-receiving indentation in said support structure for securely housing and receiving said lasant member.

18. The optically pumped laser of claim 17 wherein said solid-state component means additionally comprises focusing means for focusing light from said optical pumping means onto said lasant material; and said trough shaped support structure additionally comprises a focusing means-support portion for supporting said focusing means positioned between said pumping means-support portion and said lasant member-support portion, said focusing means-support portion defining a focusing means-receiving indentation in said support structure for securely housing and receiving said focusing means.

19. The optically pumped laser of claim 17 wherein said solid-state component means additionally comprises a nonlinear optical member for modifying the frequency of said laser light from said lasant member; and said trough shaped support structure additionally comprises a nonlinear optical member support portion positioned downstream of said lasant member, said nonlinear optical member support portion defining a nonlinear optical member-receiving identation in said support structure for securely housing and receiving said nonlinear optical member.

20. The optically pumped laser of claim 17 wherein said end plug threadedly engages said input end of said housing.

* * * * *

UNITED STATES PATENT OFFICE
CERTIFICATE OF CORRECTION

Patent No. 4,731,795                     Dated   March 15, 1988

Inventor(s)   John H. Clark and Dennis L. Werth

It is certified that error appears in the above-identified patent and that said Letters Patent are hereby corrected as shown below:

Column 5, line 24, "fequency" should read --frequency--.

Column 7, line 17, "Alterntively" should read --Alternatively--.

Column 8, line 27, "identation" should read --indentation--.

Column 10, line 6, "member of modifying" should read --member for modifying--.

Column 10, lines 16, 19 and 20, "material" should read --member--.

Signed and Sealed this

Seventeenth Day of January, 1989

Attest:

DONALD J. QUIGG

Attesting Officer        Commissioner of Patents and Trademarks